United States Patent
Hung

[19]

[11] Patent Number: 5,870,298
[45] Date of Patent: Feb. 9, 1999

[54] POWER CONVERTER WITH A LOOP-COMPENSATED FILTER

[75] Inventor: Jin-Chyuan Hung, Hsinchu, Taiwan

[73] Assignee: Industrial Technology Research Institute, Taiwan

[21] Appl. No.: 906,315

[22] Filed: Aug. 5, 1997

[51] Int. Cl.[6] .................................................. H02M 7/44
[52] U.S. Cl. ............................................ 363/98; 363/132
[58] Field of Search .................................. 363/20, 21, 95, 363/98, 131, 132, 39, 40, 44, 45, 46

[56] References Cited

U.S. PATENT DOCUMENTS

| | | | |
|---|---|---|---|
| 4,227,138 | 10/1980 | Espelage et al. | 318/802 |
| 4,358,730 | 11/1982 | Beifus | 323/322 |
| 5,410,466 | 4/1995 | Maehara | 363/98 |
| 5,729,652 | 3/1998 | Hanson | 363/46 |

Primary Examiner—Matthew Nguyen
Attorney, Agent, or Firm—Finnegan, Henderson, Farabow, Garrett & Dunner, L.L.P.

[57] ABSTRACT

A power converter with a loop-compensated filter is disclosed. The power converter includes a decoupling circuit coupled to receive a signal having a dc component and a ripple component, wherein the dc component is filtered out by the decoupling circuit. A phase shifting circuit is used to shift phase of the ripple component of the signal in the decoupling circuit, and an adding circuit is used to add the phase-shifted rippled component of the signal and a setting signal that is used to regulate level of an output from the power converter. The power converter also includes a switching power conversion circuit coupled to receive an output of the adding circuit, wherein the switching power conversion circuit feeds back the output of the power converter whereby to form a feedback loop. The feedback loop is then compensated by the phase-shifted ripple component of the signal from the phase shifting circuit.

16 Claims, 6 Drawing Sheets

POWER CONVERTER WITH A LOOP-COMPENSATED FILTER

BACKGROUND OF THE INVENTION

1. Field of the Invention

The present invention relates to a power converter, and particularly to a power converter with a loop-compensated filter.

2. Description of the Prior Art

Figure 1:
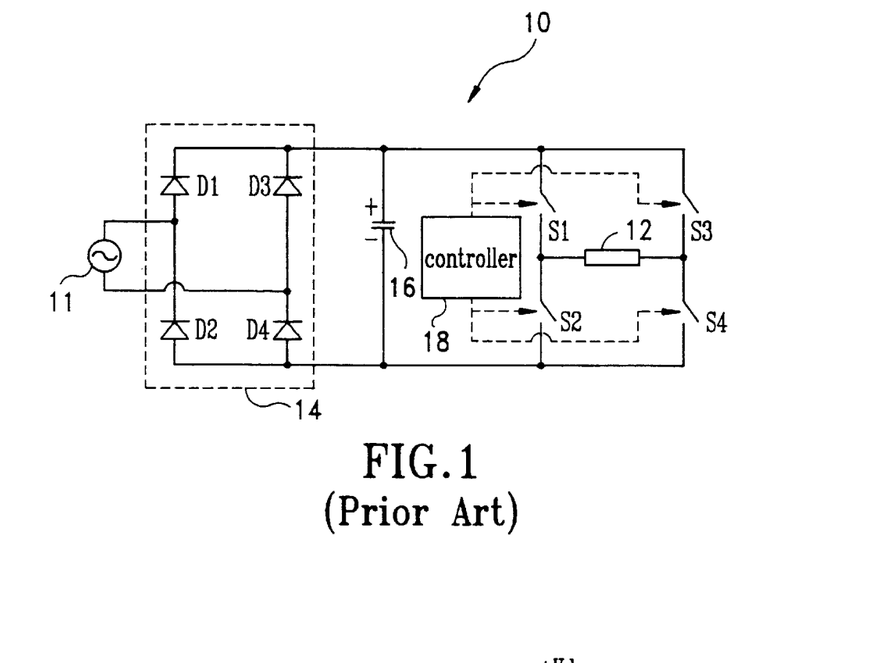
FIG. 1 depicts a schematic circuit diagram illustrating a conventional power converter used to convert an ac source to a regulated or controllable output power.

Power converters are generally used in modern power electronics industry to convert electric power from one form to another. They are mainly used in power supplies, motor control systems, high-voltage dc transmission, and other power conversion applications. Depicted in FIG. 1 is a schematic circuit diagram illustrating a conventional power converter 10 used to convert an ac source 11 to a regulated or controllable output power, which provides current or voltage across a load 12, and may be ac or dc. In this circuit, the source 11 is firstly filtered by a full-wave bridge rectifier 14 comprising diodes D1 to D4 configured as shown in the diagram. Next, a capacitor 16 is used to smooth the rectified voltage from the rectifier 14, so that the ripple component in the rectified voltage could be largely reduced. The smoothed voltage from the capacitor 16 is further controlled by a controller 18, which controls switches S1 to S4 in order to generate the ac or dc output power. One of the disadvantages for this conventional power converter 10 is the need of the bulky and costly electrolytic capacitor 16, especially in high-power converters.

Figure 2A:
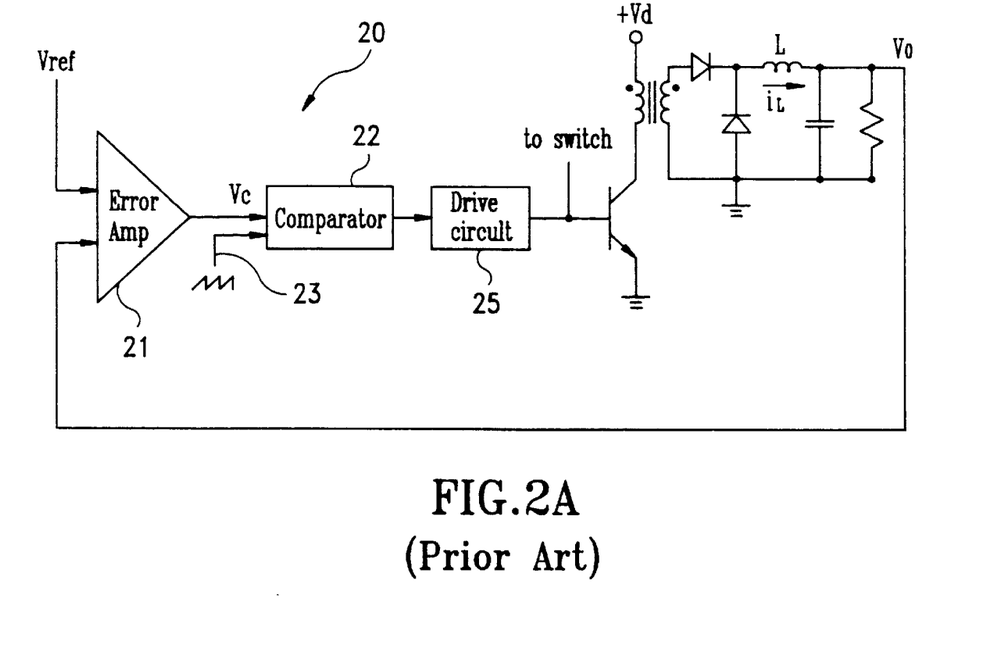
FIG. 2A shows a circuit diagram of a conventional PWM converter.
Figure 2B:
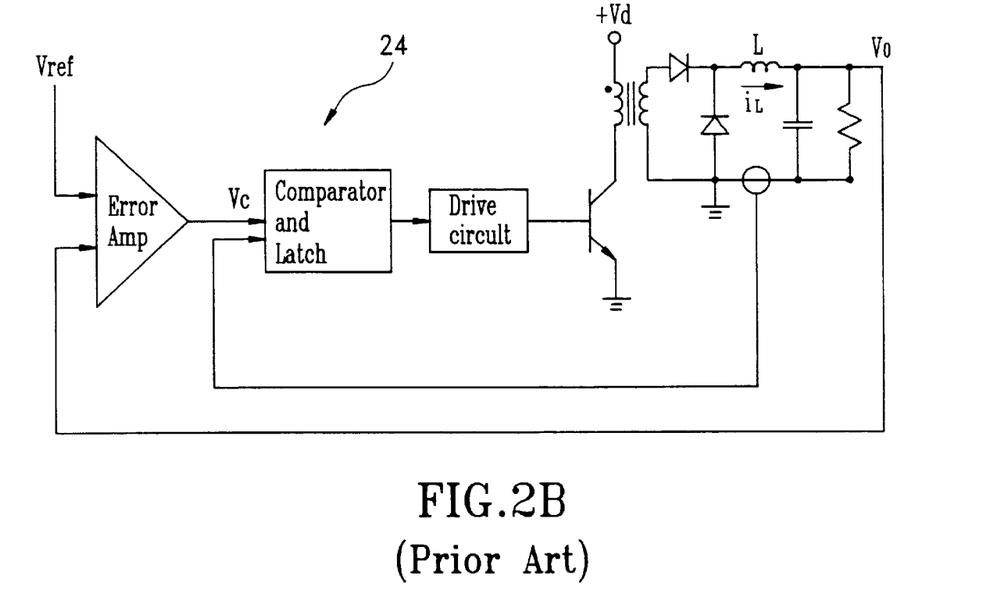
FIG. 2B shows a circuit diagram of another conventional PWM converter.

One solution to this problem is the use of pulse width modulation (PWM) to achieve voltage regulation with a capacitor 16 of reasonable size. FIG. 2A shows a circuit diagram of a conventional PWM converter 20. A control signal Vc is generated from an error amplifier 21, which amplifies an error signal between an actual output Vo and a reference Vref. The control signal Vc then controls the duty ratio of the switch (such as the switch S1, S2, S3, or S4 in FIG. 1) by comparing the control voltage Vc with a sawtooth waveform 23 through a comparator 22. This control of the switch duty ratio adjusts the voltage across the inductor L and hence the inductor current $i_L$ (which feeds the output voltage), and eventually brings the output voltage Vo to its reference value Vref. Disadvantages of this circuit 20 are poor dynamic response, and slow response to sudden input changes. Another PWM converter 24 in the art is shown in FIG. 2B, wherein the control voltage Vc directly controls the output inductor current $i_L$ in a current-mode control by using an additional inner control loop, which compares inductor current $i_L$ with the control voltage Vc. Although this PWM circuit 24 improves the problems occurred in the PWM circuit 20 of FIG. 2A, however, unstability and complexity are incurred in this circuit 24.

Figure 3:
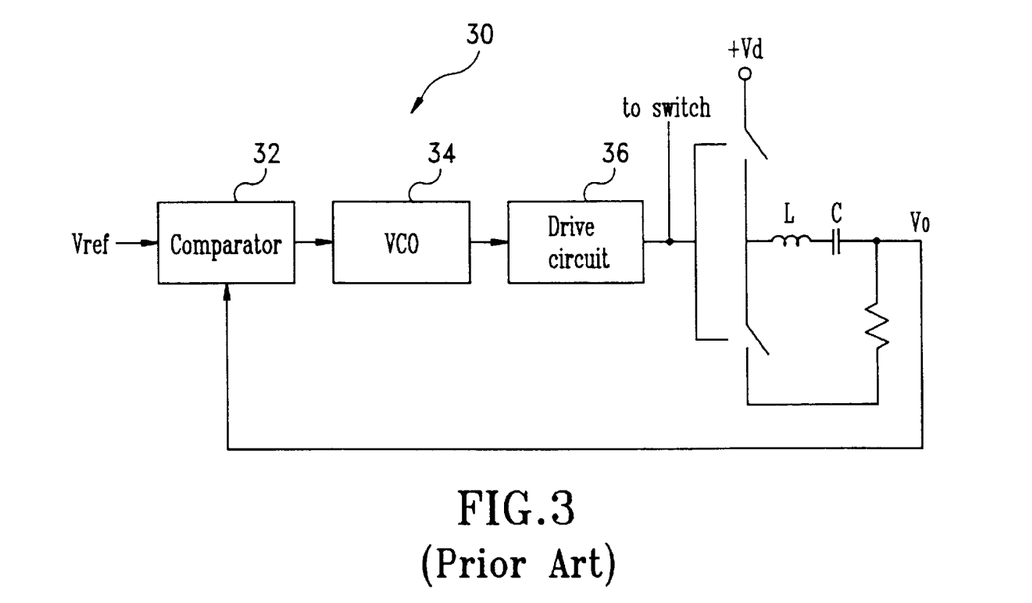
FIG. 3 illustrates a schematic block diagram of a conventional variable-frequency resonant converter.

Nowadays, in order to improve switching efficiency, a variable-frequency resonant converter configuration is disclosed. Illustrated in FIG. 3 is a schematic block diagram of a conventional variable-frequency resonant converter 30, which mainly includes a comparator 32, a voltage-controlled oscillator (VCO) 34 and a drive circuit 36. The use of inductor-capacitor LC resonating elements thus improves switching efficiency. However, the disadvantages of this variable-frequency resonant converter 30 are its high cost and complexity.

Owing to the inherent drawbacks, such as limited frequency band and response, in both PWM converters and resonant converters, the ripple component in the converted output could not be adequately reduced. Accordingly, there is a need to provide a scheme to substantially reduce this ripple component.

SUMMARY OF THE INVENTION

In accordance with the present invention, a power converter with a loop-compensated filter is provided that substantially improves regulation, switching efficiency, and stability, and also reduces size, weight, and cost of the electrolytic capacitor. In one embodiment, the power converter includes an ac source for providing an ac power signal, and a rectifier coupled to rectify the ac power signal of the ac source, thereby generating a signal having a dc component and a ripple component. A capacitor coupled to the rectifier is used to smooth the signal from the rectifier, and a decoupling circuit coupled to receive the signal is used to filter out the dc component. Further, a 180° phase shifter is used to shift phase of the ripple component of the signal in the decoupling circuit. An adder is used to add the phase-shifted rippled component of the signal and a setting signal, wherein the setting signal is used to regulate level of an output from the power converter. The power converter also includes a switching power conversion circuit coupled to receive an output of the adder, wherein the switching power conversion circuit feeds back the output of the power converter whereby to form a feedback loop. The feedback loop is then compensated by the phase-shifted ripple component of the signal from the 180° phase shifter.

In another embodiment according to the present invention, the power converter includes all elements of the previous embodiment except that the 180° phase shifter is eliminated, and the adder is replaced with an inverting summer. The inverting summer is configured to couple the ripple component of the signal from the decoupling circuit to an inverting input lead of the inverting summer, and to couple a setting signal to the inverting input lead of the inverting summer, wherein the setting signal is used to regulate level of an output from the power converter.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 4:
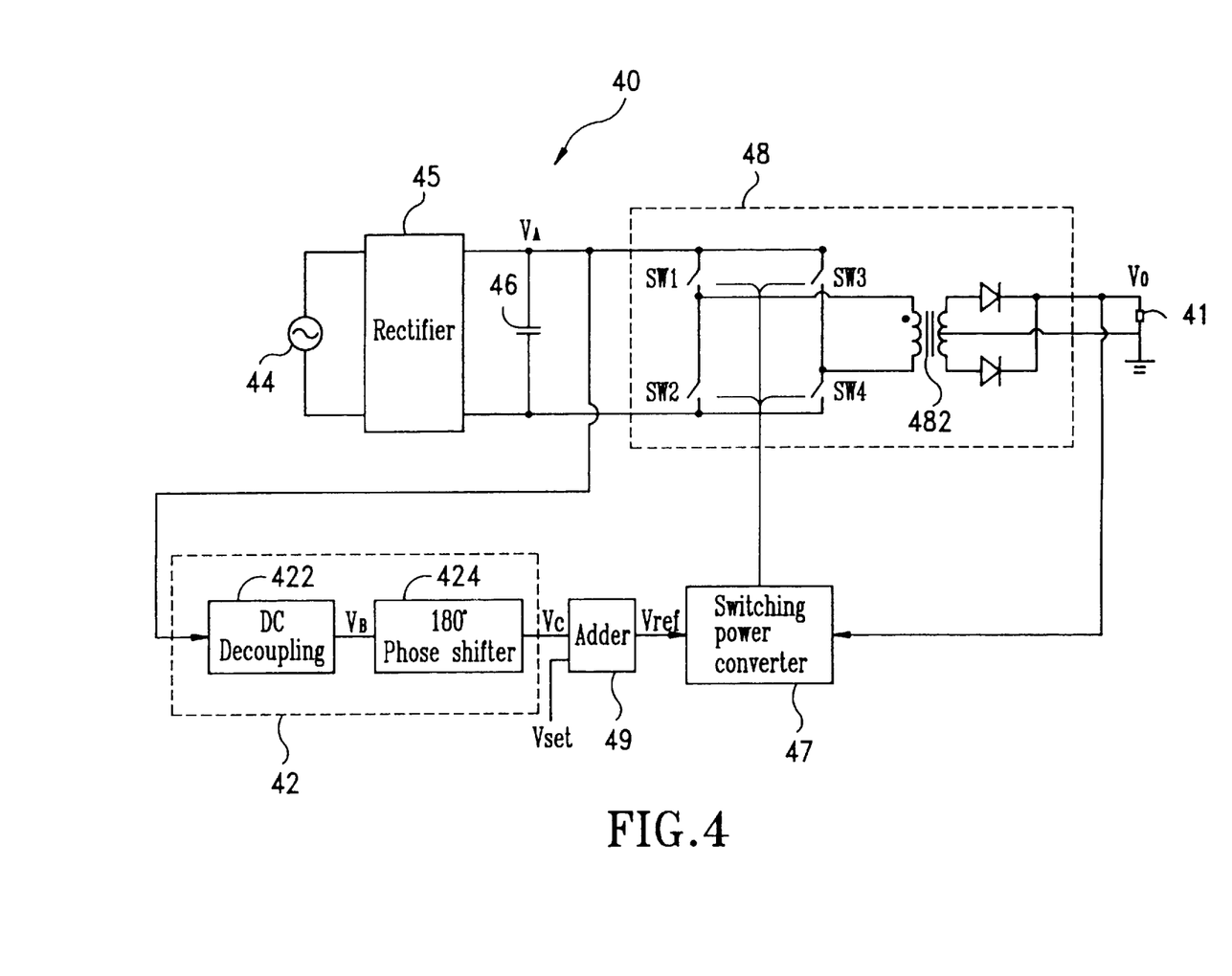
FIG. 4 shows a schematic block diagram of a power converter with a loop-compensated filter in accordance with one embodiment of the present invention.
Figure 5A:
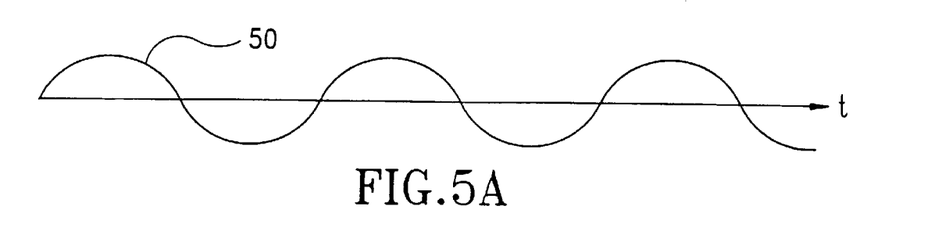
FIGS. 5A to 5F illustrate timing diagrams of critical signals in the circuit of FIG. 4.
Figure 5B:
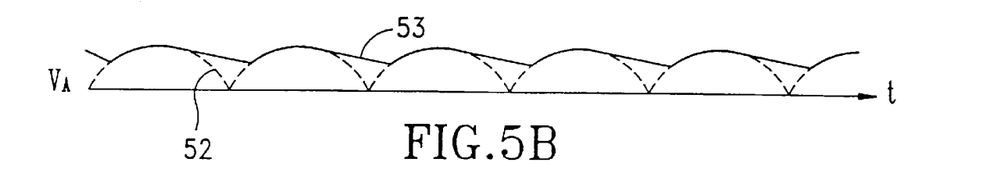
Figure 5C:
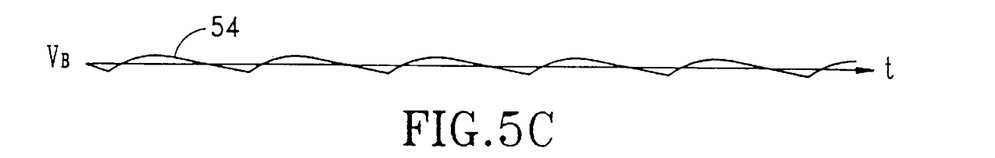

Referring to FIG. 4, there is shown a schematic block diagram of a power converter 40 with a loop-compensated filter 42 in accordance with one embodiment of the present invention. As shown in this diagram, the power converter 40 includes an ac source 44, which, in this embodiment, is a sinusoidal voltage source having a frequency of 60 Hz, represented by the waveform 50 in FIG. 5A. The output of this source 44 is then filtered by a rectifier 45, which can be a conventional half-wave bridge, full-wave bridge, or other suitable rectifier circuit. In this embodiment, a full-wave bridge such as the conventional bridge rectifier 14 shown in FIG. 1 is used. The resultant output of the bridge rectifier 14 is represented by the waveform 52 in FIG. 5B. A capacitor 46 connected between the output node of the rectifier 45 and the ground may be used to smooth the rectified voltage from the rectifier 45, resulting in an voltage $V_A$ represented by the waveform 53 in FIG. 5B. It is appreciated that the capacitance of the capacitor 46 may be substantially smaller in this embodiment than that in a conventional power converter without a loop-compensated filter, therefore substantially reducing weight and size of the power converter 40.

Block 47 represents a conventional switching power converter 47, which uses power semiconductor switches (which are schematically representative by switches SW1, SW2, SW3 and SW4 in block 48) in the on and off switching states, resulting in ac or dc output power. The switching power converter 47 may be a pulse width modulation (PWM) converter such as the circuit 20 shown in FIG. 2A, or may be a resonant converter such as the circuit 30 shown in FIG. 3. Both the PWM converter 20 and the resonant converter 30 use a switch-controlling signal from the output of the drive circuit 25 and 36 respectively to control the switch SW1, SW2, SW3 or SW4. Referring back to the block 48, a transformer 482 may be further used to electrically isolate the output from the input. It is appreciated that the circuit in the block 48 is not limited to the disclosed configuration. Rather, the configuration in the block 48 may be any conventional ad-dc, ac-ac, dc-ac, or dc-dc configuration to provide the regulated or controllable current or voltage output.

Figure 6A:
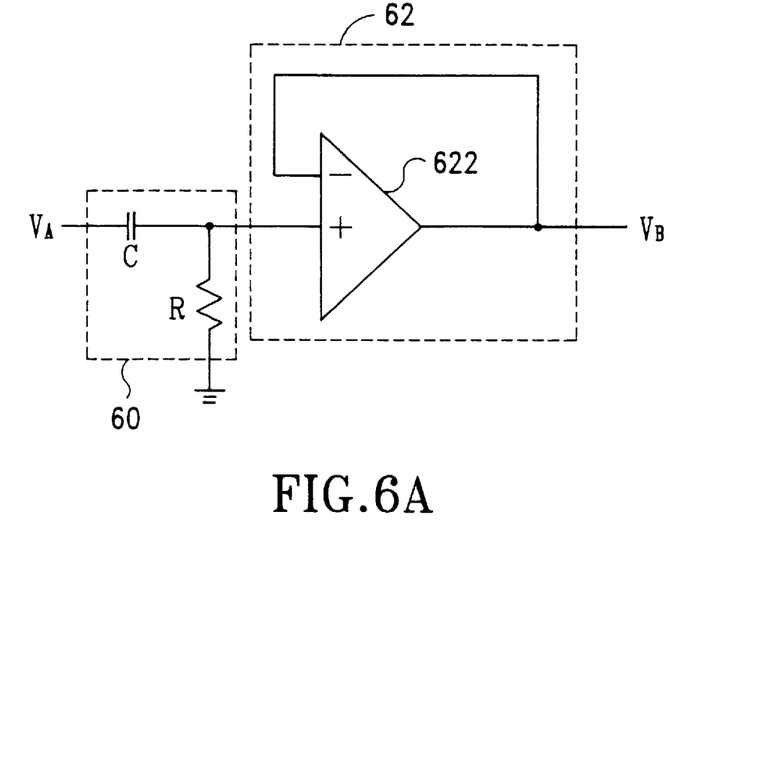
FIG. 6A demonstrates one implementation of the DC decoupling circuit by a high-pass filter.

As mentioned in the description of the prior art, the ripple component of the source 44 can not be satisfactorily eliminated by a conventional PWM converter or a resonant converter. Therefore, a loop-compensated filter 42 is used to further compensate the inefficiency in the feedback loop in the switching power converter 47. In this embodiment, the loop-compensated filter 42 includes a DC decoupling circuit 422 and a 180° phase shifter 424. The DC decoupling circuit 422 is used to decouple the output voltage $V_A$ (represented by the waveform 53 in FIG. 5B) across the capacitor 46 to filter out the dc component of the voltage $V_A$, thereby resulting in an output voltage $V_B$ represented by the waveform 54 in FIG. 5A. The DC decoupling circuit 422 may be conventionally implemented by a high-pass filter such as the resistor-capacitor RC high-pass circuit 60 shown in FIG. 6A. This RC high-pass circuit 60 may be preferably connected to the noninverting (+) lead of a unit gain follower 62 implemented by an operational amplifier (op amp) 622, wherein the output of the op amp 622 is directly connected back to its inverting (−) input lead.

Figure 5D:
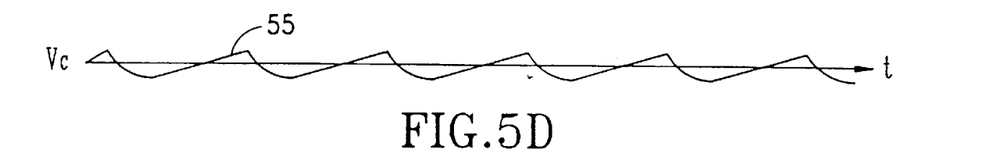

The output voltage $V_B$ of the DC decoupling circuit 422 is fed to a 180° phase shifter 424 to generate an output voltage $V_C$ (represented by the waveform 55 in FIG. 5D) that is 180 degree of phase shift from the voltage $V_B$. The 180° phase shifter 424 can be conventionally implemented by using any suitable phase shifter.

Figure 5E:
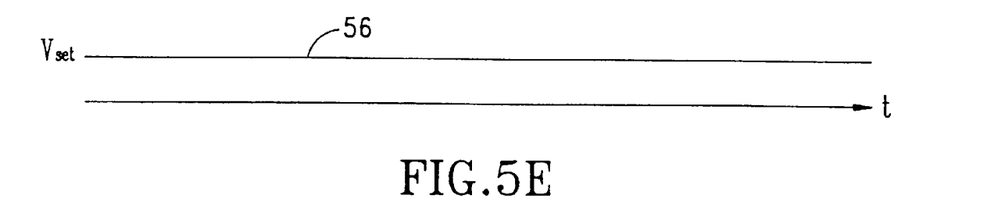
Figure 5F:
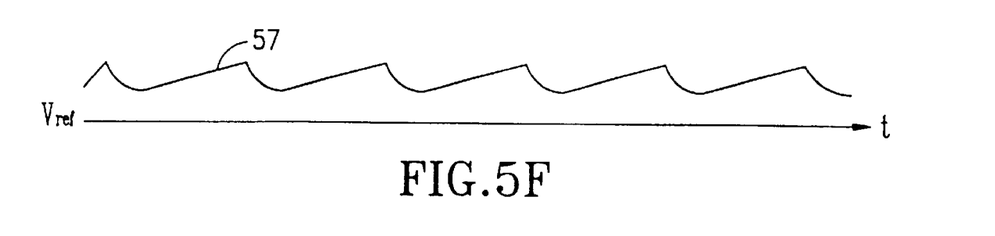
Figure 6B:
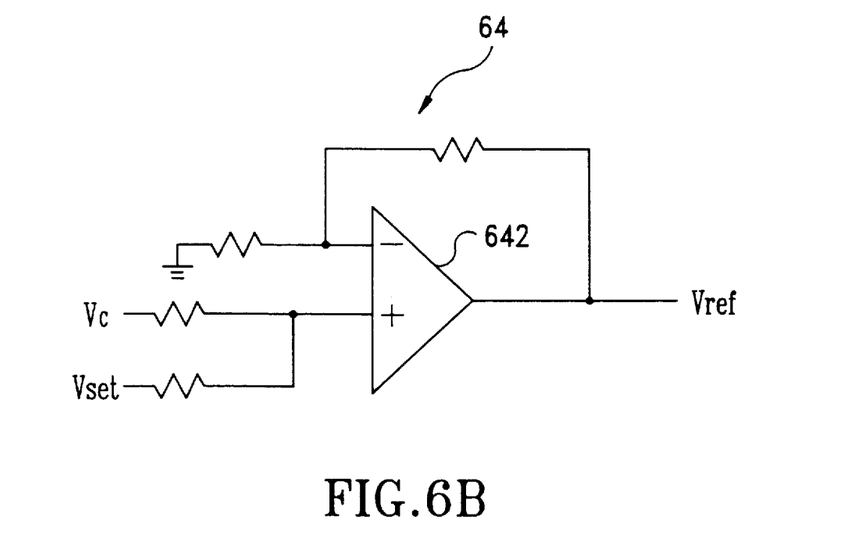
FIG. 6B shows the noninverting summer implemented by an op amp and resistors.

An adder 49 connected between the loop-compensated filter 42 and the switching power converter 47 is used to generate a reference voltage Vref by adding the output voltage Vc of the loop-compensated filter 42 and a set voltage Vset, which is the signal (represented by the waveform 56 in FIG. 5E) used to adjust the regulated level of the output power across the load 41. The adder 49 may be an noninverting summer 64 conventionally implemented by an op amp 642 and resistors configured as shown in FIG. 6B. The output voltage Vref, which is represented by the waveform 57 in FIG. 5F, is then connected to the reference input lead Vref of a PWM converter or a resonant converter in the switching power converter 47.

Figure 7A:
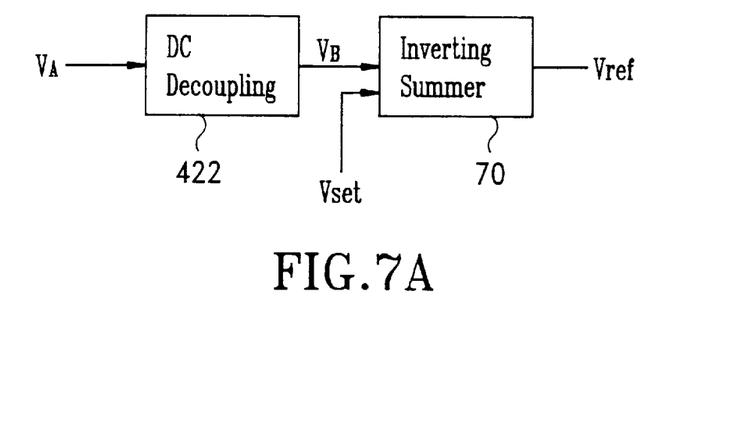
FIG. 7A illustrates another embodiment of the present invention.
Figure 7B:
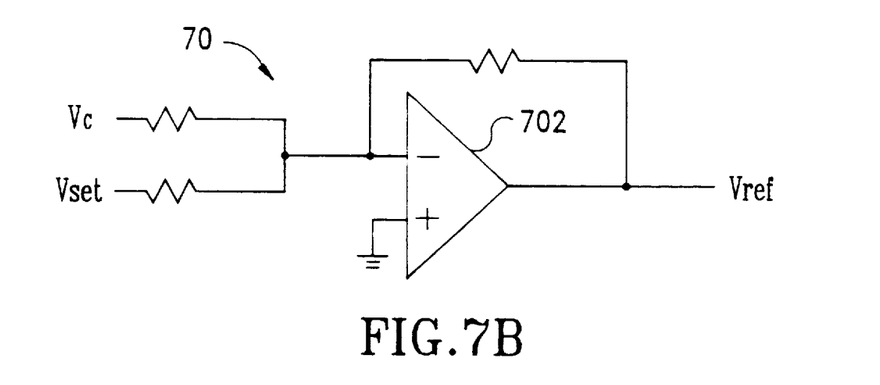
FIG. 7B shows one implementation that uses an op amp and resistors to form a summer-inverter circuit.

FIG. 7A illustrates another embodiment of the present invention, wherein only the loop-compensated filter and the adder are shown. In this embodiment, the DC decoupling circuit 422 is the same as that in FIG. 4, and is denoted by the same numeral. The 180° phase shifter 424 in FIG. 4 is eliminated in FIG. 7A, and the adder 49 in FIG. 4 is replaced by an inverting summer 70. Specifically, the phase shifting in FIG. 4 is now performed simultaneously in the inverting summer 70 together with the adding function therein. FIG. 7B shows one possible implementation that uses an op amp 702 and resistors to form the summer-inverter circuit 70.

Figure 8:
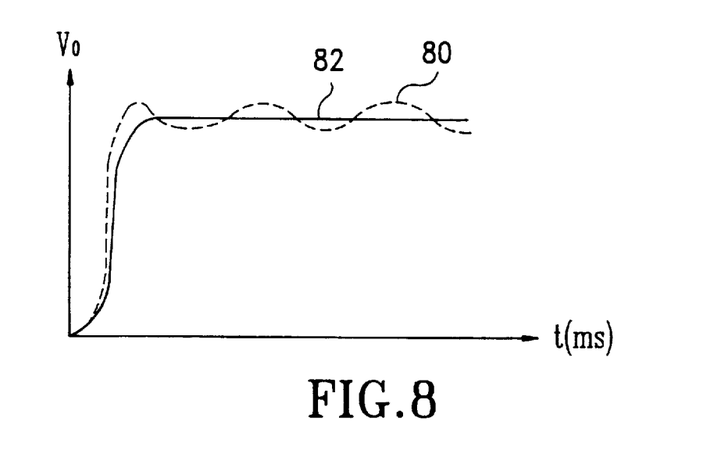
FIG. 8 illustrates the effectiveness of using the loop-compensated filter in the power converter in terms of a simulation result in accordance with the embodiment of the present invention.

FIG. 8 illustrates the effectiveness of using the loop-compensated filter in the power converter in terms of a simulation result, wherein the response curve 80 represents the output across the load 41 without the loop-compensated filter, and the response curve 82 represents the regulated output across the load 41 with the loop-compensated filter in accordance with the present invention. Therefore, regulation, switching efficiency, and stability are substantially improved, and size, weight, and cost of the capacitor 46 are thus reduced.

Although specific embodiments have been illustrated and described, it will be obvious to those skilled in the art that various modifications may be made without departing from the spirit which is intended to be limited solely by the appended claims.

What is claimed is:

1. A power converter comprising:
   a decoupling circuit coupled to receive a signal having a dc component and a ripple component, said dc component being filtered out by said decoupling circuit;
   phase shifting means for shifting phase of the ripple component of the signal in said decoupling circuit;
   means for adding the phase-shifted rippled component of the signal and a setting signal, said setting signal being used to regulate level of an output from said power converter; and
   a switching power conversion circuit coupled to receive an output of said adding means, said switching power conversion circuit feeding back the output of said power converter whereby to form a feedback loop, said feedback loop being compensated by the phase-shifted ripple component of the signal from said phase shifting means.

2. The power converter according to claim 1, further comprising a capacitor configured to smooth the signal inputting to said decoupling circuit.

3. The power converter according to claim 1, wherein said signal inputting to said decoupling circuit is a rectified ac signal that is rectified by a rectifying circuit.

4. The power converter according to claim 3, wherein said rectifying circuit comprises a full-wave bridge circuit.

5. The power converter according to claim 3, wherein an ac source is coupled to an input of said rectifying circuit.

6. The power converter according to claim 1, wherein said phase shifting means comprises a 180° phase shifter.

7. The power converter acceding to claim 6, wherein said adding means comprises an noninverting summer.

8. The power converter according to claim 1, wherein said adding means and said phase shifting means comprise an inverting summer, said ripple component of the signal from said decoupling circuit being coupled to an inverting input lead of said inverting summer, and said setting signal being coupled to an noninverting input lead of said inverting summer.

9. The power converter according to claim 1, further comprising a plurality of power semiconductor switches, on and off states of said power semiconductor switches being controlled by an output of said switching power conversion circuit thereby generating the output of said power converter, the form of the output of said power converter being ac or dc.

10. A power converter comprising:

an ac source for providing an ac signal;

a rectifier coupled to rectify the ac signal of said ac source, thereby generating a signal having a dc component and a ripple component;

a capacitor coupled to said rectifier to smooth the signal from said rectifier;

a decoupling circuit coupled to receive the signal, said dc component being filtered out by said decoupling circuit;

a 180° phase shifter coupled to shift phase of the ripple component of the signal in said decoupling circuit;

an adder coupled to add the phase-shifted rippled component of the signal and a setting signal, said setting signal being used to regulate level of an output from said power converter; and a switching power conversion circuit coupled to receive an output of said adder, said switching power conversion circuit feeding back the output of said power converter whereby to form a feedback loop, said feedback loop being compensated by the phase-shifted ripple component of the signal from said 180° phase shifter.

11. The power converter according to claim 10, wherein said rectifying circuit comprises a full-wave bridge circuit.

12. The power converter acceding to claim 10, wherein said adder comprises an noninverting summer.

13. The power converter according to claim 10, further comprising a plurality of power semiconductor switches, on and off states of said power semiconductor switches being controlled by an output of said switching power conversion circuit thereby generating the output of said power converter, the form of the output of said power converter being ac or dc.

14. A power converter comprising:

an ac source for providing an ac signal;

a rectifier coupled to rectify the ac signal of said ac source, thereby generating a signal having a dc component and a ripple component;

a capacitor coupled to said rectifier to smooth the signal from said rectifier;

a decoupling circuit coupled to receive the signal, said dc component being filtered out by said dc coupling circuit;

an inverting summer configured to couple the ripple component of the signal from said decoupling circuit to an inverting input lead of said inverting summer, and to couple a setting signal to the inverting input lead of said inverting summer, said setting signal being used to regulate level of an output from said power converter; and a switching power conversion circuit coupled to receive an output of said inverting summer, said switching power conversion circuit feeding back the output of said power converter whereby to form a feedback loop.

15. The power converter according to claim 14, wherein said rectifying circuit comprises a full-wave bridge circuit.

16. The power converter according to claim 14, further comprising a plurality of power semiconductor switches, on and off states of said power semiconductor switches being controlled by an output of said switching power conversion circuit thereby generating the output of said power converter, the form of the output of said power converter being ac or dc.

* * * * *

UNITED STATES PATENT AND TRADEMARK OFFICE
CERTIFICATE OF CORRECTION

PATENT NO. : 5,870,298
DATED : February 09, 1999
INVENTOR(S) : Jin-Chyuan HUNG

It is certified that error appears in the above-identified patent and that said Letters Patent is hereby corrected as shown below:

Claim 7, column 5, line 14, "an noninverting" should read --a noninverting--.

Claim 8, column 5, line 20, " an noninverting" should read --a noninverting--.

Claim 12, column 6, line 8, " an noninverting" should read --a noninverting--.

Signed and Sealed this

Fourteenth Day of December, 1999

Attest:

Attesting Officer

Q. TODD DICKINSON

Acting Commissioner of Patents and Trademarks